United States Patent
Handshuh et al.

(10) Patent No.: US 6,886,324 B1
(45) Date of Patent: May 3, 2005

(54) APPARATUS FOR REDUCING COKING IN GAS TURBINE BEARINGS

(75) Inventors: Robert F. Handshuh, North Olmsted, OH (US); Gary L. Farley, Yorktown, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 28 days.

(21) Appl. No.: 10/075,281

(22) Filed: Feb. 15, 2002

(51) Int. Cl.⁷ .............................................. F02C 7/06
(52) U.S. Cl. ...................................................... 60/39.08
(58) Field of Search ......................... 60/39.08; 415/175

(56) References Cited

U.S. PATENT DOCUMENTS 4,309,870 A * 1/1982 Guest et al. ............... 60/39.08

* cited by examiner

Primary Examiner—Ehud Gartenberg
(74) Attorney, Agent, or Firm—William Randolph

(57) ABSTRACT

The bearings of a gas turbine are supplied with a lubricant from a reservoir by a main pump, when the turbine is operating. When the turbine is shut down and rotation ceases, the main pump also shuts down. When this occurs, an auxiliary pump is placed into operation to continue to supply the bearings with the lubricant until such time as the bearings have sufficiently cooled, at which point the auxiliary pump is shut down.

5 Claims, 1 Drawing Sheet

APPARATUS FOR REDUCING COKING IN GAS TURBINE BEARINGS

STATEMENT OF GOVERNMENT INTEREST

The invention described herein may be manufactured and used by or for the Government of the United States of America for government purposes without the payment of any royalties therefor.

BACKGROUND OF THE INVENTION

Gas turbines, including those used for propelling military vehicles, include two or more opposed bearings which must be continuously lubricated during gas turbine usage. This is accomplished by means of a lubricating system which provides the bearings with a lubricating fluid, such as natural or synthetic oil, to not only lubricate the bearings but to also provide for cooling.

When the gas turbine is shut down after usage, the residual heat from the turbine (which may be hundreds of degrees Fahrenheit) soaks back to the bearings leading to a possible coking condition. Basically, coking is the result of the lubricant becoming an oxidized solid oil deposit on the bearing surface and in the lubricant delivery system that can lead to insufficient lubricant supply to the bearings. This can result in engine seizure and/or a requirement for a complete engine overhaul, which is undesirable, particularly in tactical combat situations.

Accordingly, it is a primary object of the present invention to provide apparatus which reduces, or eliminates coking problems in rotating machinery, particularly, in gas turbines which shut down at high temperatures.

SUMMARY OF THE INVENTION

Apparatus in accordance with the present invention reduces coking in turbine bearings, such as gas turbine bearings, and includes a lubricant reservoir and a main pump for delivering the lubricant to the bearings when the turbine is operating. The delivery of lubricant is via respective lubricant supply lines and the return of lubricant to the reservoir is via respective lubricant return lines. An auxiliary pump is provided and is operable to continue the supply of lubricant to the bearings after the turbine and main pump have shut down. A control has an input indicative of turbine rotation to turn the auxiliary pump on when turbine rotation has ceased. Temperature sensors are provided to sense lubricant temperature, and these temperature indications are provided to the control which turns off the auxiliary pump when the lubricant temperature has attained a predetermined value.

BRIEF DESCRIPTION OF THE DRAWINGS

The invention will be better understood, and further objects, features and advantages thereof will become more apparent from the following description of the preferred embodiment, taken in conjunction with the accompanying drawings, in which.

DETAILED DESCRIPTION OF THE PREFERRED EMBODIMENTS

Figure 1:
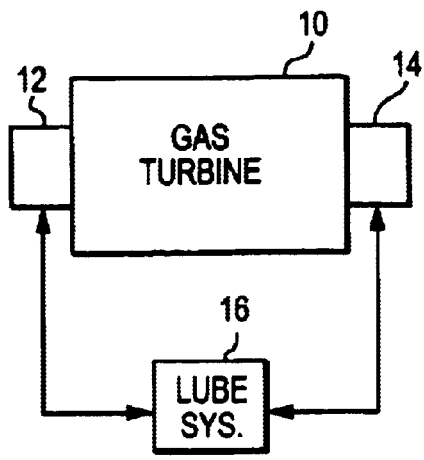
FIG. 1 is a simplified block diagram of a gas turbine and lubricating system.

In the drawings, which are not necessarily to scale, like or corresponding parts are denoted by like or corresponding reference numerals.

In FIG. 1, a rotating gas turbine 10 is supported by opposed first and second bearings 12 and 14, although, more such bearings may be utilized, depending upon turbine size and design.

Figure 2:
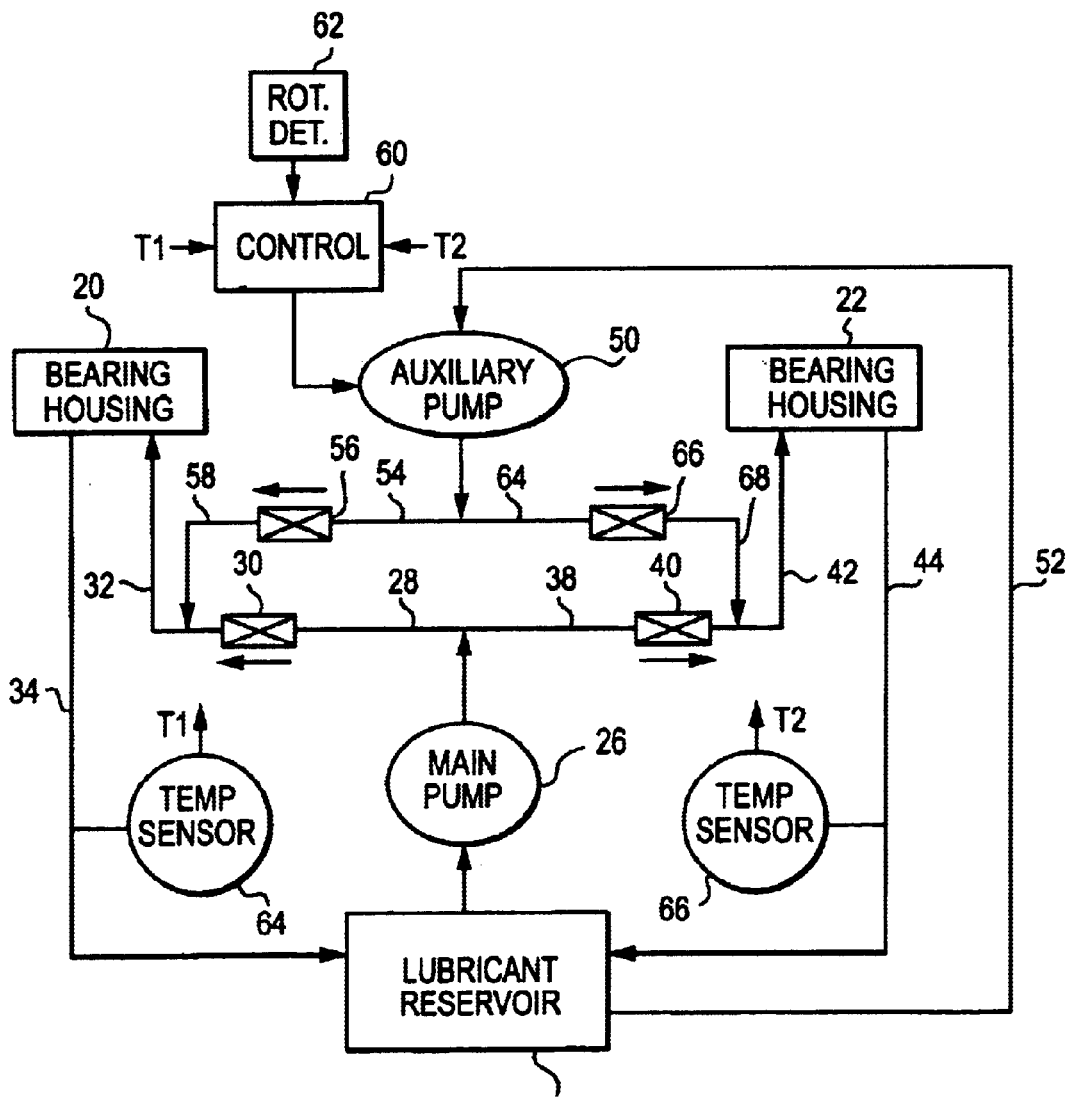
FIG. 2 is a block diagram of an embodiment of the present invention.

A lubricating system 16 is provided in order to supply the bearings with necessary lubrication and cooling during use, and when the gas turbine 10 shuts down, the lubrication system also shuts down, leading to a possible coking condition, as previously explained. The present invention obviates this problem, and to this end reference is made to FIG. 2, illustrating a preferred embodiment.

A two bearing system is shown by way of illustration and includes first and second bearings positioned in respective bearing housings 20 and 22. The apparatus includes the normal lubricant reservoir 24, and main pump 26 for supplying the lubricant to the bearings. More particularly, the bearing in housing 20 is supplied with lubricant from the reservoir 24 by the path including main pump 26, fluid line 28, one-way valve 30 (the arrow shows fluid flow direction) and fluid line 32. Lubricant is returned to the reservoir 24 from housing 20 via fluid line 34, for cooling, filtering and recirculation.

In a similar fashion, the bearing in housing 22 is supplied with lubricant from the reservoir 24 by the path including main pump 26, fluid line 38, one-way valve 40 and fluid line 42. Lubricant is returned to the reservoir 24 from housing 22 via fluid line 44, for cooling, filtering and recirculation.

When the gas turbine shuts down, the main pump 26, which is driven by the turbine through a gearing arrangement, is also shut down. This situation can lead to coking due to the high residual heat encountered by the bearings. Accordingly, the apparatus additionally includes an auxiliary pump 50 which functions to continuously supply the bearing housings with cooling lubricant after turbine shut down. As opposed to the turbine-driven main pump 26, the auxiliary pump 50 is battery operated.

Auxiliary pump 50, connected to fluid reservoir 24 by fluid line 52, supplies lubricant to bearing housing 20 by the path including fluid line 54, one-way valve 56, and fluid line 58 connecting with fluid line 32. Return of lubricant from housing 20 is by the same path 34 used during turbine usage.

Similarly, auxiliary pump 50 supplies lubricant to bearing housing 22 by the path including fluid line 64, one-way valve 66, and fluid line 68 connecting with fluid line 42. Return of lubricant from housing 22 is by the same path 44 used during turbine usage.

Operation of the apparatus may be governed by a control circuit 60 which is operative to turn on the auxiliary pump 50 when the gas turbine is shut down and stops rotating. This is accomplished with the provision of rotation sensor 62 which is coupled to the turbine and provides an output signal to control 60 when turbine rotation has ceased. Control 60 turns on auxiliary pump 50 and maintains it in an on condition to supply cooling lubricant to the bearings.

Once the bearings have cooled down to an acceptable level, the auxiliary pump 50 may be shut down. In order to accomplish this, the apparatus of FIG. 2 includes first and second temperature sensors 64 and 66 connected to measure the temperature, for example, in respective lubricant return lines 34 and 44. The temperature sensors provide output signals, indicative of those temperatures, to control 60 and when the temperature values have reached acceptable levels, control 60 will shut off auxiliary pump 50. Thus the arrangement continuously cools the bearings after turbine shut down, to minimize, or prevent coking.

It will be readily seen by one of ordinary skill in the art that the present invention fulfills the primary object set forth herein. After reading the foregoing specification, one of ordinary skill in the art will be able to effect various changes, substitutions of equivalents and various other aspects of the present invention as broadly disclosed herein. It is therefore intended that the protection granted hereon be limited only by the definition contained in the appended claims and equivalents. Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

What is claimed is:

1. Apparatus for minimizing coking in bearings of a turbine, comprising:

a lubricant reservoir containing a lubricant;

first and second lubricant supply lines extending from the lubricant reservoir and connected to each of the bearings;

a main turbine pump driver connected to the first lubricant supply line for supplying the lubricant through the first lubricant supply line to the bearings, when the turbine is operating;

an auxiliary electrical pump connected to the second lubricant supply line for supplying the lubricant through the second lubricant supply line to the bearings; and control means connected to the turbine and the auxiliary pump for turning on the auxiliary pump when the turbine is turned off and for supplying lubricant to the bearings;

a lubricant return line connected to the lubricant reservoir and the bearings for returning the lubricant from the bearings to the lubricant reservoir;

temperature sensors connected to the lubricant return line and the control means for measuring the temperature of the lubricant in the lubricant return line, and the control means turning off the auxiliary pump when the temperature of the lubricant in the lubricant return line falls below a predetermined temperature.

2. The apparatus of claim 1, wherein the first and second lubricant supply lines are separate and spaced from each other.

3. The apparatus of claim 1, wherein the first and second lubricant supply lines are separate and distinct from each other.

4. The apparatus of claim 1, wherein the first and second lubricant supply lines each include one way valve means for allowing the lubricant to flow only from the lubricant reservoir to the bearings.

5. Apparatus for minimizing coking in bearings of a turbine, comprising:

a lubricant reservoir containing a lubricant;

first and second lubricant supply conduits extending from the lubricant reservoir and connected to the turbine bearings, wherein the first and second conduits are separate from each other;

a main pump connected to the first lubricant supply conduit for supplying lubricant through the first lubricant supply conduit to the bearings, when the turbine is operating;

an auxiliary pump connected to the second lubricant supply conduit for supplying the lubricant through the second lubricant supply conduit to the bearings;

control means connected to the turbine and the auxiliary pump for turning on the auxiliary pump when the turbine is turned off and for supplying lubricant to the bearings;

a lubricant return conduit connected to the lubricant reservoir and the bearings for returning the lubricant from the bearings to the lubricant reservoir; and temperature sensors connected to the lubricant return conduit for measuring the temperature of the lubricant in the lubricant return conduit, and the control means further connected to the temperature sensors and the auxiliary pump for turning off the auxiliary pump when the temperature of the lubricant in the lubricant return conduit is below a predetermined temperature.

* * * * *